(12) United States Patent
Davis et al.

(10) Patent No.: US 9,195,977 B2
(45) Date of Patent: *Nov. 24, 2015

(54) SYSTEM AND METHOD FOR REMOTE DEPOSIT SYSTEM

(71) Applicant: EFT Network, Inc., Hawthorne, NY (US)

(72) Inventors: Steven Davis, Ossining, NY (US); Stephen A. Schutze, Midlothian, VA (US)

(73) Assignee: EFT Network, Inc., Hawthorne, NY (US)

( * ) Notice: Subject to any disclaimer, the term of this patent is extended or adjusted under 35 U.S.C. 154(b) by 394 days.

This patent is subject to a terminal disclaimer.

(21) Appl. No.: 13/771,256

(22) Filed: Feb. 20, 2013

(65) Prior Publication Data

US 2013/0159182 A1    Jun. 20, 2013

Related U.S. Application Data

(60) Division of application No. 13/593,061, filed on Aug. 23, 2012, which is a continuation of application No. 11/504,473, filed on Aug. 14, 2006, now Pat. No. 8,296,230.

(51) Int. Cl.
*G07F 19/00* (2006.01)
*G06Q 20/10* (2012.01)
*G06Q 20/04* (2012.01)
*G06Q 40/02* (2012.01)

(52) U.S. Cl.
CPC ............ *G06Q 20/108* (2013.01); *G06Q 20/042* (2013.01); *G06Q 40/02* (2013.01)

(58) Field of Classification Search
CPC ... G07F 19/20; G07F 7/1008; G06Q 20/1085; G06Q 30/02
USPC .................................................. 235/379, 375
See application file for complete search history.

(56) References Cited

U.S. PATENT DOCUMENTS 8,296,230 B2 * 10/2012 Davis et al. ..................... 705/39

* cited by examiner

*Primary Examiner* — Karl D Frech
(74) *Attorney, Agent, or Firm* — Whitham, Curtis, Christofferson & Cook PC; Mary Goulet

(57) ABSTRACT

Described is a method and system for a remote deposit system. The method comprises receiving facsimile data corresponding to facsimile of a plurality of checks, constructing digitized images of the checks as a function of the facsimile data, gathering check data from each of the digitized images, and processing the check data according to a check processing procedure to settle transactions referenced by each of the checks.

5 Claims, 10 Drawing Sheets

Step 208 of Fig. 4

Step 210 of Fig. 4

SYSTEM AND METHOD FOR REMOTE DEPOSIT SYSTEM

BACKGROUND

Remote check deposit systems generally require a depositor (e.g., person/entity wishing to deposit a check) to own a check scanner and a computer with access to a computer network (e.g., the Internet). A check scanned by the check scanner is transmitted to a financial institution over the computer network so that the check may be cleared against an account of the check writer as a check or substitute check (e.g., in accordance with the Check 21 Act) or converted to an electronic debit for processing through an Automated Clearing House or direct clearing relationship. The funds may be credited to the depositor's account and debited from the check writer's account. When the depositor receives a large number of checks each day, it is economical to own and maintain the scanner, the computer and the network access. However, for smaller depositors which only receive a few checks per day/week, expenses from the scanner, the computer and network access unnecessarily increase overhead. There is a need for a remote transaction interface which eliminates the cost to the depositor of the scanner, the computer and the network access.

SUMMARY OF THE INVENTION

The present invention relates to a system and method for a remote deposit system. The method comprises receiving facsimile data corresponding to facsimile of a plurality of checks, constructing digitized images of the checks as a function of the facsimile data, gathering check data from each of the digitized images, and processing the check data according to a check processing procedure to settle transactions referenced by each of the checks.

DETAILED DESCRIPTION

Figure 1:
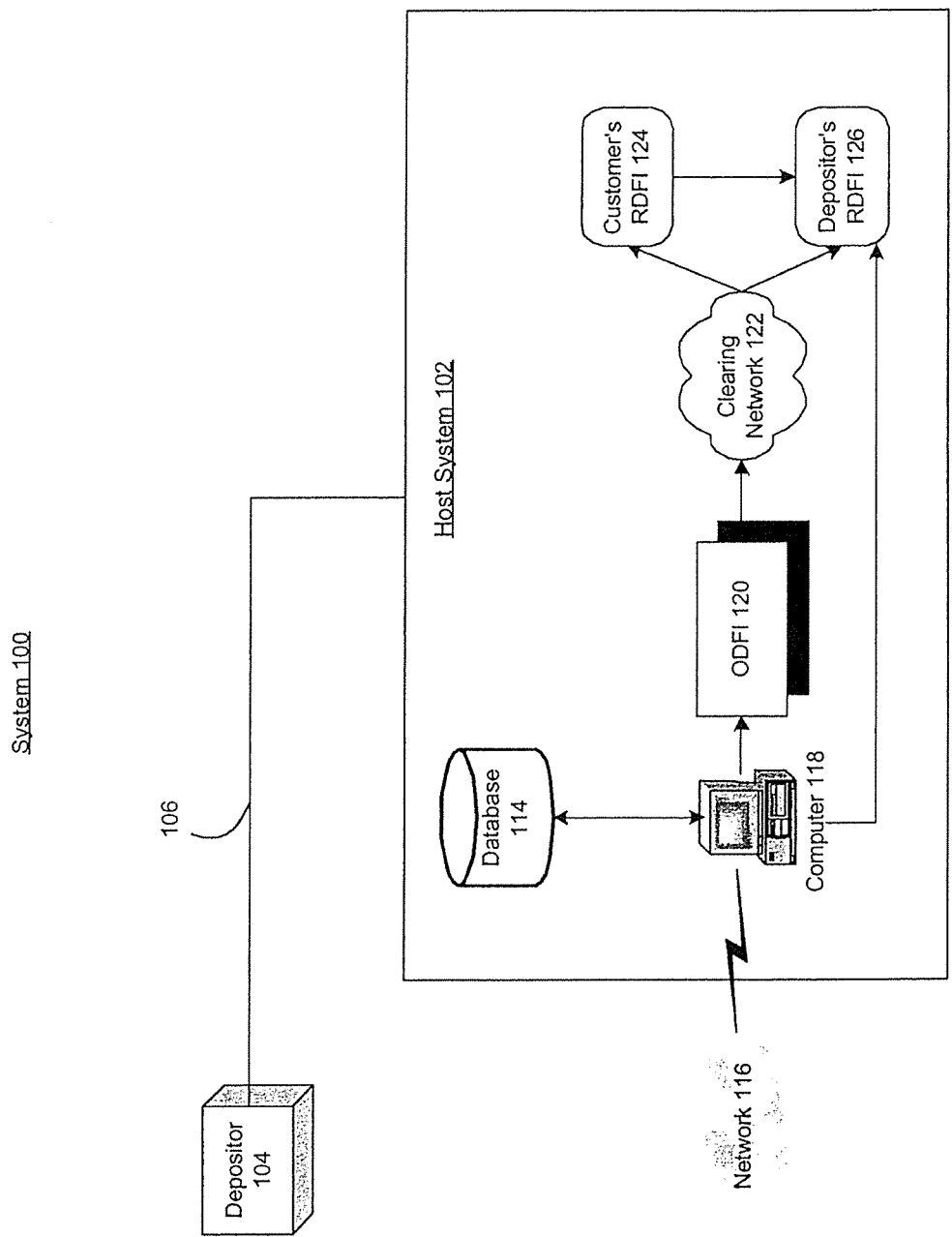
FIG. 1 shows an exemplary system according to the present invention for a remote deposit system.

The present invention may be further understood with reference to the following description and the appended drawings, wherein like elements are referred to with the same reference numerals. The exemplary embodiment of the present invention describes a system and method for a remote deposit system. Those of ordinary skill in the art will understand that the present invention complies with all rules and regulations governing EFT and check processing including, but not limited to the Check 21 law allowing for the use of substitute checks.

FIG. 1 shows an exemplary embodiment according to the present invention of a system 100 for a remote deposit system for financial instruments (e.g., personal checks, corporate checks, business checks, traveler's checks, money orders, Federal Reserve checks, government checks, third party checks, convenience checks, cashier checks, official checks, non-U.S. checks, gift checks, etc.). The system 100 may also identify and process payment coupons submitted with the financial instruments. For example, the payment coupons may correspond to goods/services provided or an order for goods/services. The payment coupons may be processed in a substantially similar manner as the financial instruments, as described herein.

The system 100 includes a depositor 104 (e.g., an individual, an organization, a corporation, a government/municipality, etc.) which is connected to a host system 102 over a telephone network 106 (e.g., PSTN, ISDN, FDDI). The system 100 generally comprises a front-end implemented at the depositor 104 and a back-end implemented at the host system 102.

Figure 2:
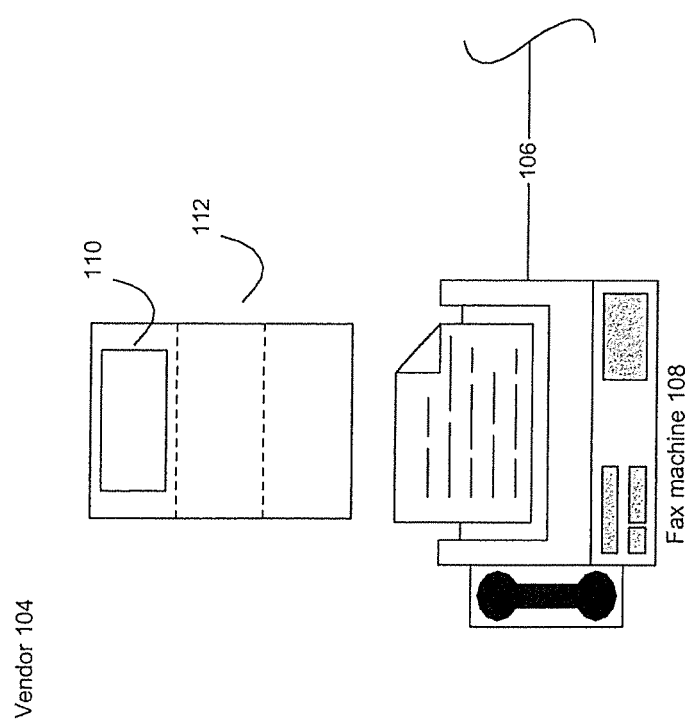
FIG. 2 shows an exemplary front-end for a remote deposit system according to the present invention.

FIG. 2 shows the front-end of the system 100 implemented at the depositor 104 which includes an electronic device capable of communicating with the host system 102 over the telephone network 106. In the exemplary embodiment, the electronic device is a fax machine 108 which may be any conventional facsimile machine or other type of non-check scanner. When the depositor 104 intends to deposit a check 110, the check 110 may be endorsed and placed into a carrier 112. The carrier 112 is then fed into the fax machine 108 and faxed to the host system 102 via the telephone network 106. A recipient electronic device (e.g., fax machine, PC, laptop, etc.) connected to the telephone network 106 at the host system 102 receives data, generates an image of the check 110 based on the data and processes the image to deposit funds in an account of the depositor 104. The processing of the image crops each check image from the transmitted image, marries the front and back of each check image and performs optical character recognition (OCR) on a Magnetic Ink Character Recognition (MICR) line, in E13B or CMC-7 font, on the bottom of the front of each check image.

Figure 3:
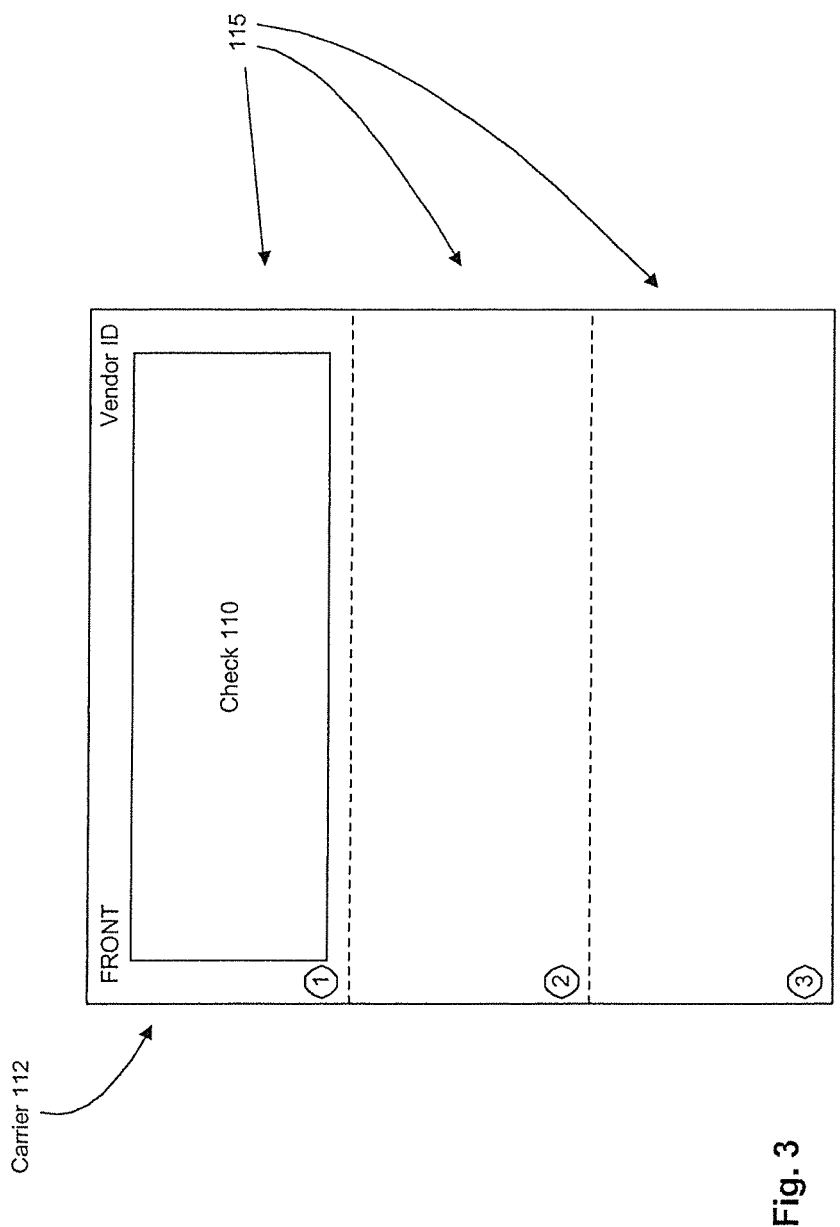
FIG. 3 shows an exemplary check carrier for a remote deposit system according to the present invention.

FIG. 3 shows an exemplary embodiment of the carrier 112 according to the present invention. The carrier 112 may be issued to the depositor 104 by an entity operating the host system 102, or, in the alternative, the depositor 104 may construct the carrier 112 according to instructions provided by the entity operating the host system 102. In this manner, the carrier 112 may uniquely identify the depositor 104. For example, the carrier 112 may have a depositor identifier (e.g., individual name, company name, business identifier, bank account number, etc.) printed thereon, so that when the image of the carrier 112 is received by the host system 102, the depositor 104 is easily identified, either manually or automatically (e.g., optical character recognition (OCR)), as will be explained further below.

The carrier 112 may be formed as two sheets of transparent material adhered to each other in selected locations to form any number of pockets for receiving a corresponding number of checks (or other financial instruments) therein. For example, in the exemplary embodiment shown in FIG. 3, the carrier 112 includes three pockets 115, each having an opening for receiving the check 110 therein. When the check 110 is inserted into the pocket 115, both faces of the check 110 are visible through the transparent material comprising the carrier 112. Those of ordinary skill in the art will understand that the carrier 112 may include one transparent sheet if used with a single-side fax machine, because the depositor 104 may fax an image of the front face of the check 110 and reorient it to fax an image of the back face. However, the preferred embodiment utilizes the two sheets of transparent material, and may also use a dual-sided fax machine which simultaneously generates data for both sides of the carrier 112.

Along with the depositor identifier, the carrier 112 may include other indicia which may be manually and/or automatically (e.g., OCR) identified at the host system 102. For example, the carrier 112 may include "FRONT" and "BACK" markers indicating front and back sides of the carrier 112 and, similarly, front and back faces of the checks therein. Numerical markers may be used to indicate a position of each pocket (e.g., "1" for first pocket, and so on). The carrier 112 may further include one or more general pocket receiving, for example, a totals slip indicating a total number of checks and a total amount of the checks included in the carrier 112 in a predefined time period (e.g., a day, since a previous total amount was indicated), a note to the host system 102, etc. The one or more general pocket (not shown) may be any size and shape while the pockets 115 are sized and shaped to receive the check 115. Those of ordinary skill in the art will understand that two different carriers may be used: one with pockets sized and shaped for personal checks and another for business checks. In the exemplary embodiment, the pockets 115 are large enough to receive either a personal check or a business check.

When the depositor 104 intends to deposit the check 110 (and, optionally, other checks), the check 110 is inserted into the carrier 112, and the carrier 112 is faxed to the host system 102 over the telephone network 106 using the fax machine 108. A recipient electronic device (e.g., a computer 118 shown in FIG. 1) receives the fax and constructs images of the front and back faces of the carrier 112. The images are then processed by a computer 118. The computer 118 identifies the depositor 104, counts a number of checks and computes a total check amount which may be compared to the value provided on the totals slip. The computer 118 crops, if necessary, and combines the front- and back-face images of each check using pocket markers and/or page identifiers imprinted on the carrier 112. The images may be automatically reoriented so as to have the checks in the same orientation. The host system 102 then performs OCR on a magnetic ink character recognition (MICR) line of the check. The computer 118 may use courtesy amount recognition (CAR) and legal amount recognition (LAR) and the value on the totals slip to confirm a total amount of the checks. If the total amount is not confirmed, the computer 118 may provide an alert so that an operator may visually confirm the totals. Also, if any of the checks do not meet standard or federal image quality assurance regulations, the depositor 104 may be asked either by the host system 102 via response facsimile or by an operator via telephone or email to re-fax the carrier 112 or the selected check(s) contained in the carrier 112.

When the checks have been confirmed and processed, a response message (e.g., fax, email, letter) may be sent to the depositor 104 confirming the deposit. The images may be stored in the database 114 which is accessible via a network 116 (e.g., the Internet) for the depositor 104 to review its file(s) which are maintained by the host system 102.

The database 114 may further include information, such as contact data for the depositor 104 and/or its customers (e.g., names, addresses, phone numbers, etc.), goods and/or services provided, amounts deposited, financial institution information, or any other data that the host system 102 may require to deposit the check 110. In the alternative exemplary embodiment, the database 114 may include a plurality of databases situated in one or more locations with each database storing a particular type of data. The database 114 is accessible by the computer 118 (e.g., a computing arrangement that has basic input and output devices as well as memory and storage devices) and may be accessible by a further computer (not shown) at the depositor 104 via the telephone network 106 and/or the network 116.

Figure 4:
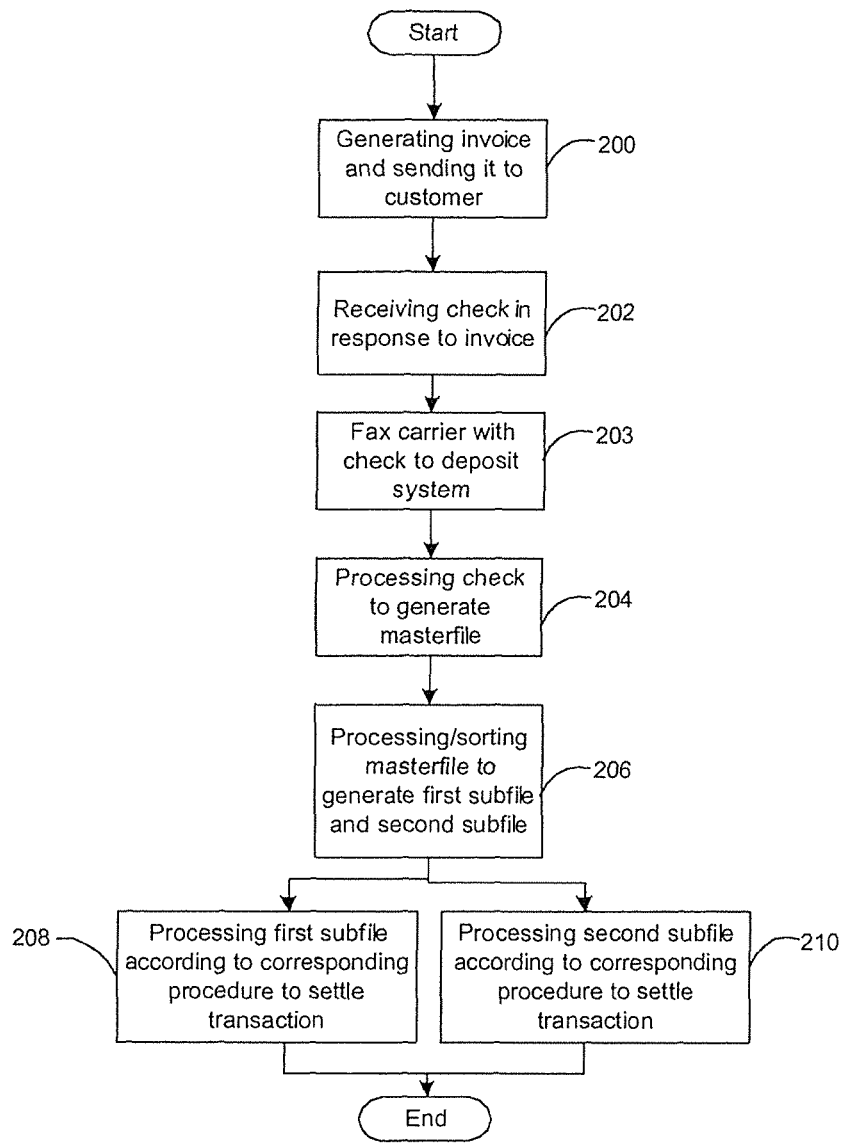
FIG. 4 shows an exemplary method according to the present invention for a remote deposit system.

The system 100 is also described in conjunction with FIG. 4 which shows an exemplary embodiment of a method according to the present invention. In step 200, the depositor 104 may receive the check as part of normal retail business or generate and send an invoice to a customer notifying the customer that a payment is due for particular goods and/or services provided by the depositor 104 and/or a third party provider.

The invoice is only one of a plurality of means of apprising the customer of the outstanding debt. For instance, the customer may have a regular business relationship with the depositor 104 in which the depositor 104 supplies the customer with goods and/or services on a regular basis pursuant to a contract (e.g., monthly, weekly, etc.). In another instance, the customer has a contractual obligation to pay the depositor 104 on a periodic basis (e.g., monthly) and does not require a separate monthly notice in form of the invoice. In an alternative exemplary embodiment of the present invention, the customer may be a donor which has chosen to send an unsolicited donation to a charity or not-for-profit organization; the unsolicited donation would need to be accompanied by a notification of truncation/conversion of the check 110. Thus, the step 200 of generating the invoice may be optional.

In step 202, the depositor 104 receives the check 110 from the customer either in response to the invoice or for other purposes some of which were described above. The check 110 may be one of two categories/types: a first type of check drawn on a consumer account (e.g., a personal checking account); or a second type of check drawn on a non-consumer account (e.g., a business checking account, a third-party business account). It should be noted that the accounts of both the customer and depositor 104 may be at the same or different financial institutions. The process of depositing the check 110 may depend on the type of check. However, the exemplary embodiment of the present invention allows the depositor 104 to electronically deposit the check 110, regardless of its type (i.e., consumer or non-consumer checks).

In step 203, the depositor 104 inserts the check 110 (along with any other checks) into the pocket(s) 115 in the carrier 112 and faxes the carrier 112 to the host system 102.

Figure 10:
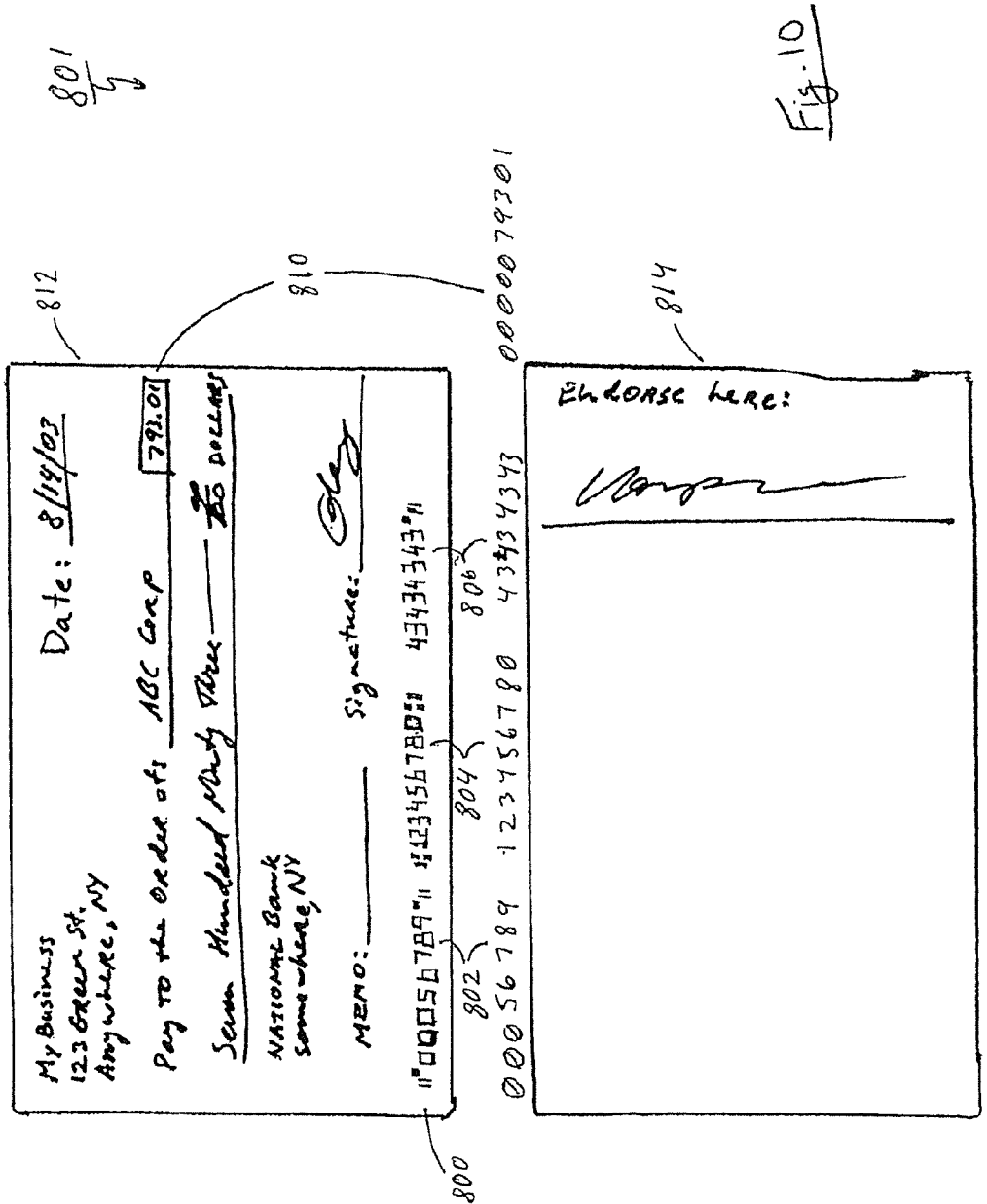
FIG. 10 shows an exemplary embodiment of a digital check record.
Figure 11:
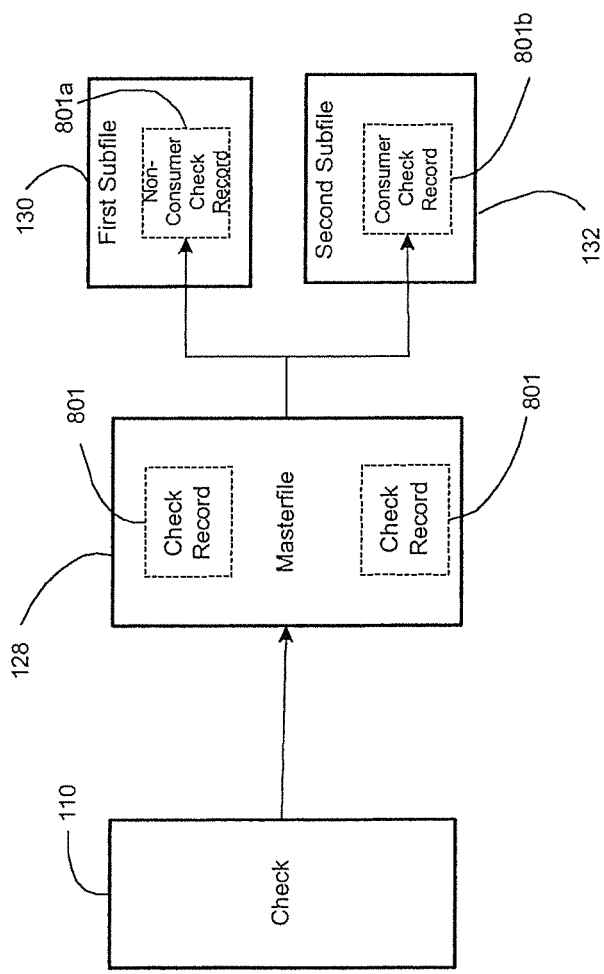
FIG. 11 shows a flow chart diagram of processing checks according to the present invention.

In step 204, the computer 118 processes the fax of the carrier 112 in order to generate a digital masterfile 128 as shown in FIG. 11. The masterfile 128 contains a record 801 for each of the checks 110. An exemplary record 801 is shown in FIG. 10. The exemplary record 801 is for a non-consumer check. The record 801 may include a digitized image of the check 110 (e.g., a front image 812 and a back image 814) as well as other check data such as an amount 810, an ABA number 804, an account number 806, a check number 802, and other information (i.e., the date when the check 106 was written or prepared for deposit; data obtained from the MICR line 800). Some of the check data may be obtained from a MICR line 800 as discussed in greater detail below. Those of ordinary skill in the art will understand that consumer checks may have the same format or a different format from the exemplary non-consumer check illustrated in FIG. 10.

The record 801 may be obtained by generating the image of the check 110 using the faxed copy of the carrier 112. Once the check 110 is received, the computer 118 captures the MICR line 800, the front image 812 and the back image 814. Then the computer 118 parses and analyzes the front image 812 and the back image 814 as well as the check data (e.g., 802, 804, 806, 810, etc.) and stores it in the masterfile 128. Those ordinarily skilled in the art would understand that the masterfile 128 may include just a single check or a plurality of checks of either or both types.

As shown in FIG. 11, the masterfile 128 may include check records 801 for multiple checks 106 received by the depositor 104. The processing is accomplished via specialized software which may be installed on the computer 118. The process of capturing the check data for the masterfile 128 is described in greater detail below.

In step 206, the records 801 of the masterfile 128 are subjected to additional processing to sort each record 801. In the exemplary embodiment of FIG. 1, the processing of the masterfile 128 is accomplished by the computer 118 which has access to the database 114.

In step 206, the masterfile 128 is processed and sorted in order to separate the non-consumer check records 801a into a first subfile 130 and consumer check records 801b into a second subfile 132 as shown in FIG. 11. According to the present invention, the sorting is done once the records 801 have been created and stored in the masterfile 128. The computer 118 processes the masterfile 128 to generate the first and second subfiles 130 and 132. The sorting process is described in greater detail below.

After the sorting of the masterfile 128 into the first subfile 130 containing the non-consumer check records 801a and the second subfile 132 containing the consumer check records 801b, the first subfile 130 may be processed pursuant to non-consumer check procedures (e.g., as defined by the U.S. Banking or other applicable rules and regulations) as discussed in step 208 and the second subfile 132 may be submitted for processing pursuant to consumer check procedures as discussed in step 210. The first and second subfile 130, 132 are submitted to an Original Deposit Financial Institution ("ODFI") 120 or financial institution by the computer 118. It should be noted that the computer 118 and the ODFI may be owned by the same or separate entities. For example, the ODFI 120 may be a financial institution that is providing the deposit services to the depositor 104. The ODFI 120 may follow specific procedures in depositing the consumer and non-consumer checks.

In step 208, the computer 118 may process the non-consumer checks by sending the first subfile 130 containing the non-consumer check records 801a directly to the depositor's receiving deposit financial institution ("RDFI") 126 or financial institution, or a third party's RDFI. Alternatively, the RDFI 126 may print the non-consumer check records 801a stored in the first subfile 130 (e.g., create a substitute check) and manually deposit the substitute check. This process is described in more detail below.

In step 210, the ODFI 120 deposits the consumer checks by transmitting the second subfile 132 to a Clearing Network 122 (e.g., the ACH Network, Federal Reserve Bank, a private clearing house). The Clearing Network 122 settles each transaction by debiting a customer's RDFI 124 for the amount 810 of the check 110 from the customer's checking account and by crediting the depositor's RDFI 126 by the amount 810 to the customer's 104 account. Those ordinarily skilled in the art would understand that the second subfile 132 may be processed in accordance with procedures for non-consumer checks as described in the step 208.

Figure 5:
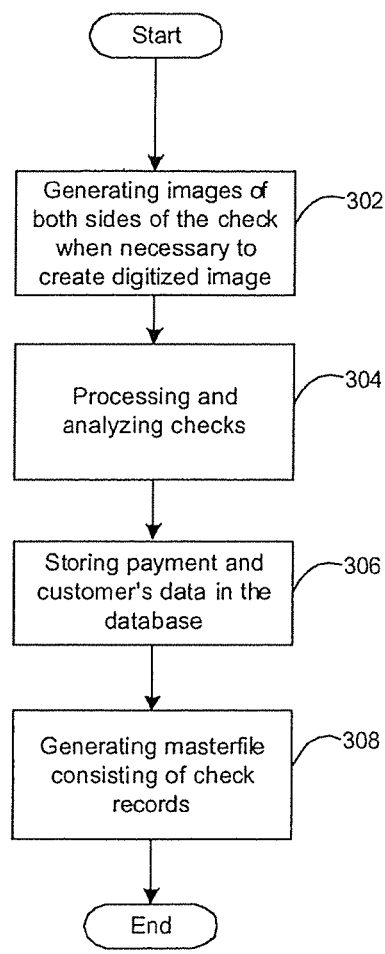
FIG. 5 shows a method for digitizing checks according to the present invention.

FIG. 5 shows a method for processing the check 110 to obtain the record 801 and create the masterfile 128 as discussed with reference to step 204 of FIG. 2. As stated above the record 801 may include the front image 812, the back image 814, the MICR line 800, as well as the data extracted from the MICR line 800 (e.g., routing number 804, account number 806, check number 802), the amount 810, and other miscellaneous data (e.g., the date the check was issued). The record 801 may also include data about the customer (i.e., remaining balance, overdue payment, etc.) extracted from the database 114 if there was a prior dealing between the parties.

In step 302, the computer 118 generates a digitized image of each side of the check 110 to produce the front image 812 and the back image 814. The front image 812 may contain the date the check 110 was written, the addresses of the customer 102 and customer's RDFI 124, and the customer's signature. The front image 812 also contains the amount 810 and the information concerning the customer's 102 account encoded in the MICR line 800.

In step 304, the MICR line 800 of the check 106 is processed and analyzed. The MICR line 800 is located at the bottom of the front image 812 and is typed in MICR font (e.g., E13B, CMC-7). The MICR line 800 may consist of the routing number 804, the account number 806, the check number 802, and other symbols and/or fields. The standardized printing of the MICR line 800 allows the first computer 112 to recognize the numbers and characters contained therein, using a conventional character recognition software along with MICR formats as commonly used by certain banks and/or companies in the host system 102 resulting in easy digitization of the data 816. After the MICR line 800 is parsed the data is stored in the record 801 along with the front image 812 and the back image 814.

The information contained in the MICR line 800 is essential for processing of the check. Every financial institution in the United States may have one or more unique routing numbers issued in conjunction with the Federal Reserve and/or Acuity, the registrar of routing numbers of the American Bankers Association. While a financial institution may have a multitude of routing numbers, those routing numbers are normally associated with that particular financial institution. The account number is also a unique identification number issued by a financial institution to distinguish between a multitude of account-holders at that financial institution. Furthermore, each check issued from a particular financial institution account may have a check number. A combination of the above-described numbers often makes a check unique, thus allowing the settlement transaction to be carried out in many cases electronically (e.g., without presenting a physical proof of the financial instrument to a financial institution).

In addition to analyzing the MICR line 800, the computer 118 may also analyze the amount 810 ("courtesy amount") located at the right side of the front image 812. The computer 118 may use character recognition software to recognize the handwritten amount 810 ("legal amount"), or in some cases printed amount 810, and store it in a digital format in the record 801. The character recognition analysis may encounter difficulties in converting the handwritten amount 810, due to the unique nature of each person's writing style. Thus, the character recognition software may have a certain accuracy in determining the amount 810 based on the analysis of the handwriting. Therefore, there may also be a manual final verification of the amount 810. After verification, the amount 810 is also stored in the record 801. Furthermore, the software may also capture other information to include in the record 801 such as the date of the check and the name and address on the check 110.

After the record 801 is created, the computer 118 may update the database 114 in step 306. The updating step may include reporting of a discrepancy between the amount 810 in the record 801 and the amount expected by the depositor 104, the correlation of the customer's check number 802 to a particular invoice, the verification of the customer's name and address, etc. In addition, if this is the first check received from a particular customer, the information (e.g., routing number 804, account number 806, etc.) for the customer may be added to the database 114.

In step 308, the masterfile 128 is generated. The masterfile 128 includes records 801 of every check 110 processed by the computer 118. Thus, the masterfile 128 may include a plurality of data files and image files corresponding to each check which are combined into a single file as shown in FIG. 11.

As described with reference to FIG. 4, after the masterfile 128 is created, it is processed to generate the first and second subfiles 130 and 132 (step 206 of FIG. 4). This step may be performed on a single computer (e.g., the computer 118) or a plurality of computers. In this example, the analysis and the sorting process are performed using a sorting software application running on the computer 118.

Figure 6:
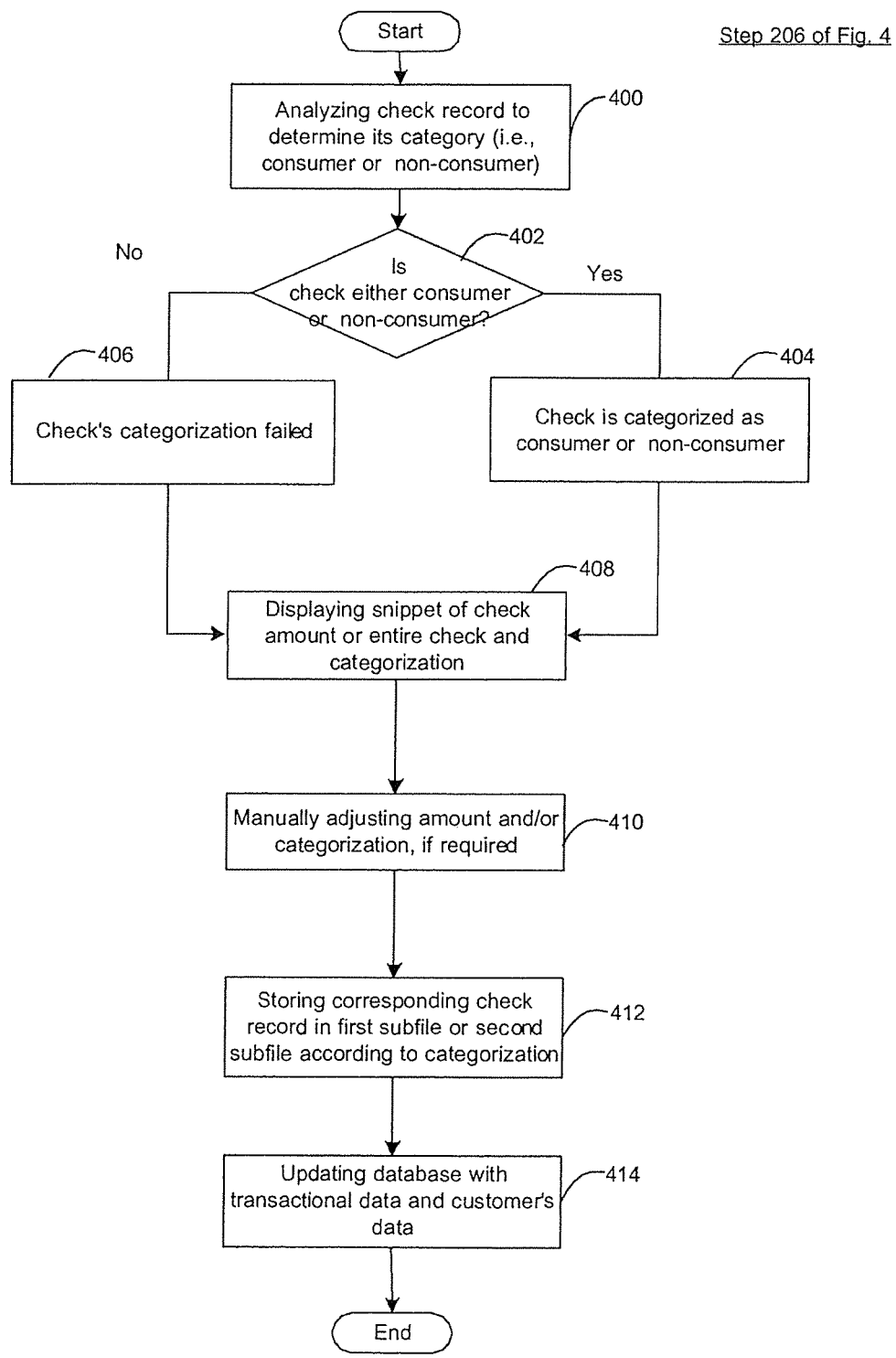
FIG. 6 shows a method according to the present invention for sorting checks into a first subfile and a second subfile based on the check's categories.

FIG. 6 shows an exemplary method for sorting checks 110 as described with reference to step 206 of FIG. 4. In step 400, the sorting software analyzes each record 801 contained in the masterfile 128 to determine its category (i.e., a non-consumer check or a consumer check). This analysis may be accomplished in a number of different manners.

In one example, the sorting software may analyze a format of the MICR line 800. Since each category of check generally uses a different format for the MICR line 800 (i.e., positioning and spacing of the routing number, the account number, and the check number). As described above, the exemplary check shown in FIG. 10 is the general format of a non-consumer check, i.e., MICR line 800 is formatted having the check number 802 at the far left, followed by the routing number 804 and the account number 806. For consumer checks (not shown), the format is generally the routing number located at the far left followed by the account number and the check number. Thus, by reading the format of the MICR line 800, the sorting software may determine whether the check is a consumer check or a non-consumer check.

In another exemplary embodiment of the present invention, the non-consumer check shown in FIG. 10 illustrates the use of special characters surrounding the routing number 804 and the check number 802. Conversely, for consumer checks, the special characters generally surround the routing number and the account number. Thus, by reading the special characters or other proprietary software, the sorting software may be able to determine whether the check is a consumer check or a non-consumer check. Those of ordinary skill in the art will understand that there may be other unique features of consumer checks and/or non-consumer checks that may be used to sort between the two types of checks.

Occasionally, a check may have a differently formatted MICR line that deviates from the accepted norms. As a result, the above-described analyses based on the format of the MICR line 800 may be inconclusive and further analysis may be required. However, even if the sorting software concludes that the check 106 is of a particular type, the sorting software may proceed with the further analysis to verify its own conclusion, which may be based on historical information from previous checks processed and retained by the host system 102.

After completing the analysis of the MICR line 800, the sorting software may compare the routing number 804 and the account number 806 with the information stored in the database 114. If the customer has previously sent a check to the depositor 104 from the same checking account, then a record of that transaction may be stored in the database 114. Thus, if there is data of the previous transaction in the database 114, the data will include information as to whether the account was a consumer account or a non-consumer account. The sorting software may search the database 114 for the routing number 804 and the account number 806 to find a match in the old payment records. If the routing number 804, the account number 806 of the check 110 match the routing number and the account number of the previous check, then the check 110 originated from the same account, hence its category is the same. Thus, the sorting software may verify its previous conclusion or come to an initial conclusion based on this checking.

Another example of a sorting method may use the amount of the check. For instance, the sorting software may utilize the amount 810 to find a matching amount in one of the unpaid invoices. If such an invoice is found, the information about the customer is obtained from the database 114 and the check 110 is categorized accordingly. For example, if the amount 810 is for $701.32 and in the database 114 the invoice for $701.32, then there is a match. After the match is found and the information about the customer is extracted, the sorting software categorizes the check 106 according to the category of the customer. Thus, if the customer is a non-consumer then check 110 is categorized as a non-consumer check. This categorization method only works in certain situations. For example, there is a possibility that the category of the check may not match the category of the customer (e.g., a business owner paying with a consumer check). Furthermore, this sorting algorithm may only work when there is a single invoice that matches the amount 810. Thus, if there are multiple invoices with that match the amount 810 or none of the invoices match the amount 810, this analysis is inconclusive.

Regardless of whether or not the sorting software provides a definite result, the sorting software may run more sorting algorithms or move to the next step. However, if the sorting software is unable to determine whether the check 110 is consumer or non-consumer, it will conclude its analysis and categorize the check 110 using a default category. The default category may be consumer, non-consumer, or undefined and it may require manual categorization by the user.

In step 402, the sorting software used in the host system 102 determines if the check 110 is consumer or non-consumer based on the analysis described above. If the analysis is inconclusive, the categorization has failed, and in step 406, the sorting software does not categorize the check 110.

The sorting software may provide information about the check 110 to the depositor 104 and request or require manual adjustment of the check categorization as discussed below in step 408. If the sorting software was successful in categorizing the check 110, then, in step 404, it stores in the record 801 the corresponding category. Regardless of the categorization, in step 408, the computer 118 may display the results of its analysis on a monitor 500 (e.g., as shown in FIG. 7), other display arrangements or output devices.

The monitor 500 may show the categorization of the check 110 if the sorting software was able to determine it in steps 400-402. If it is possible to determine the categorization of the check 110, then in step 404 the sorting software selects either a "Consumer" field 508 or a "Non-consumer" field 510. For instance, if the check 110 is a non-consumer check, then the "Non-consumer" field 510 is highlighted. However, if the computer 118 is unable to categorize the check 110 then it will set the categorization to default (e.g., a non-consumer), allowing an operator to select the proper field as explained below in regard to another check record.

Figure 7:
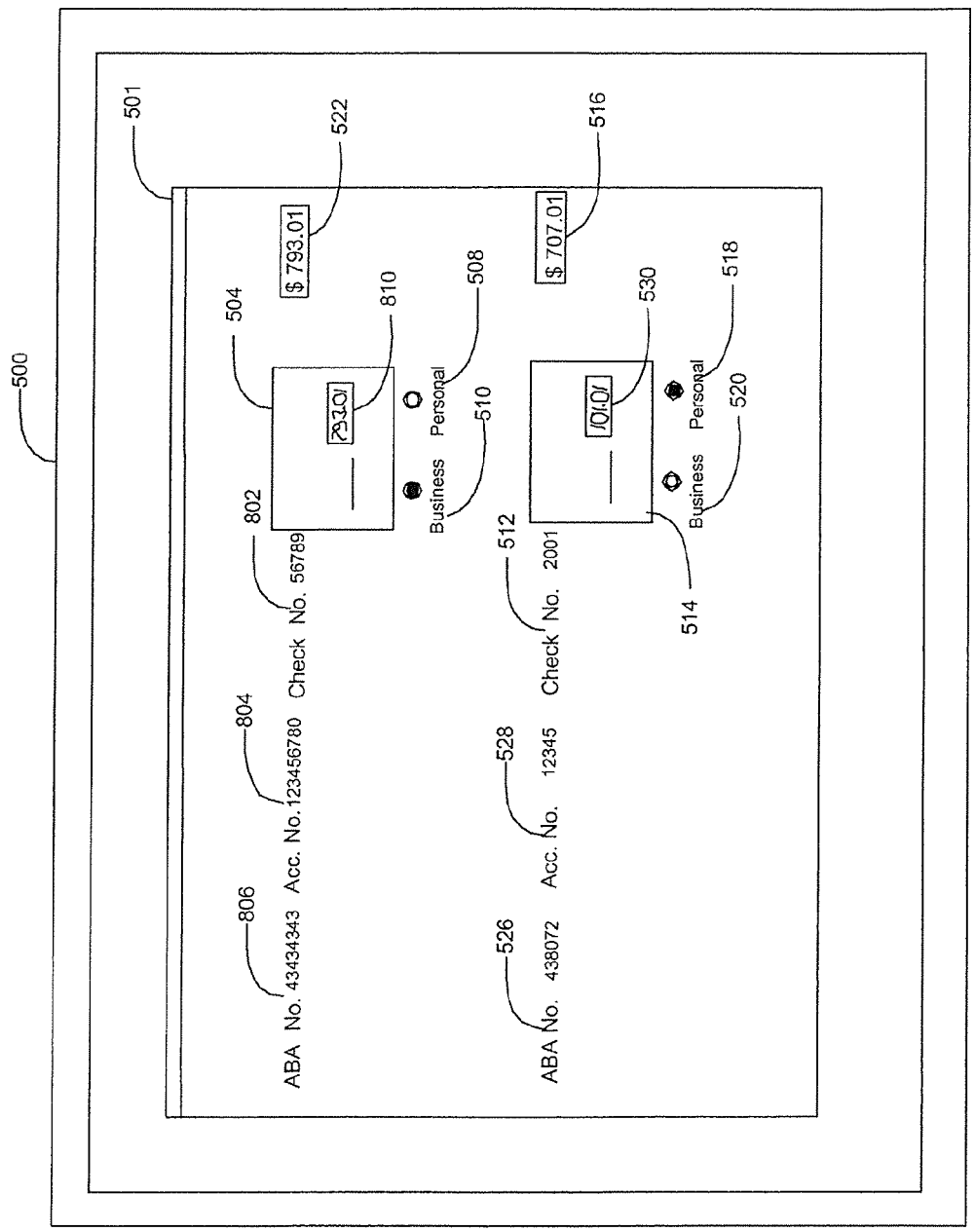
FIG. 7 shows a screenshot of an exemplary embodiment of a software application according to the present invention.

In the example of FIG. 7, the monitor 500 includes a digital check record of a second check which includes an account number 528, an routing number 526, a check number 512, a snippet 514, and a digital amount 516. In this case, the digital amount 516 is different from an amount 530 being displayed in the snippet 514. In addition, the "Consumer" field 518 is highlighted, since the computer 118 failed to categorize the check in step 406 and provided that the "Consumer" field 518 is the default category. The user may correct the digital amount 516 by changing it from $707.01 to reflect the sum of $101.01 shown in the amount 530 (step 410). As discussed above, the operator may also manually categorize the check by choosing the check's categorization based on the information supplied by the snippet 514.

After the check 110 is categorized, either by the user or the sorting software, the record 801 is stored in a corresponding subfile, either the first or second subfile 130 or 132 (step 412). The first and second subfiles 130 and 132 are similar to the masterfile 128 since they also contain a collection of records 801. However, the records 801 within either subfile 130 or 132 are of the same category, either non-consumer or consumer. If the check 110 is a non-consumer check, then it is stored in the first subfile 130. However, if the check 110 is issued from a consumer bank account, then it is stored in the second subfile 132. After the first subfile 130 and the second subfile 132 are generated, they are uploaded to the ODFI 120 for further processing.

In step 414, the database 114 is updated with transactional data (e.g., routing numbers, account numbers, contact information, etc.). Regular updates maintain the database 114 so that it may be used during categorization of checks in the future as discussed above. For instance, during the amount-matching sorting algorithm, when the sorting software searches the database 114 for invoices 108.

Figure 8:
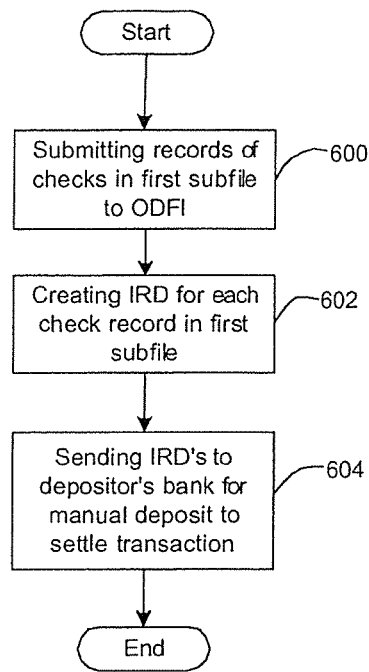
FIG. 8 shows a method for depositing non-consumer check records stored in the first subfile according to the present invention.

FIG. 8 shows an exemplary method according to the present invention for depositing non-consumer check records 801a stored in the first subfile 130. In step 600, the first subfile 130 is sent to the ODFI 120 or financial institution for processing. As previously described, non-consumer checks may not be entered into the Clearing Network 122. Therefore, in step 602, the ODFI 120 utilizes different depositing procedures which may require a substitute check for each check from its corresponding check record. A substitute check is created based on a check record, as shown in FIG. 10. It displays the front side 812 and the back side 814 and in effect replaces the check 110 (e.g., if the check 110 was issued from a non-consumer account). The substitute check also acts as a legal substitute for the original check. In step 604, the ODFI 120 sends the substitute check of the check 110 to the depositor's RDFI 126 or financial institution in order to settle the transaction referenced by the check 110. Thus, the non-consumer checks are deposited in the same manner as if they were brought physically to the financial institution (e.g., depositor's RDFI 126).

Figure 9:
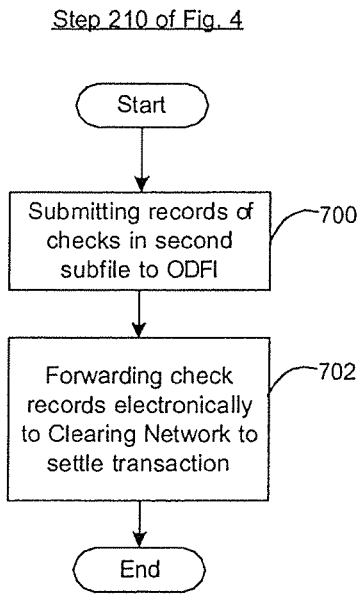
FIG. 9 shows a method for depositing consumer check records stored in the second subfile according to the present invention.

FIG. 9 shows a method for depositing consumer check records stored in the second subfile 132 according to the present invention. In step 700, the ODFI 120 receives the second subfile 132 containing the check records of consumer checks. In step 702, the ODFI 120 forwards the check records from the second subfile 132 to the Clearing Network 122 in order to settle transactions referenced by the checks whose data is stored in the second subfile 132.

The Clearing Network 122 receives the records stored in the second subfile 132. The Clearing Network 122 may verify if the transactions in the second subfile 132 complies with various procedures. For instance, the Clearing Network 122 may check for duplicate entries, amount of a check, the number of times a particular check has been presented, etc. Subsequently, the Clearing Network 122 debits the customer's RDFI 124 to deduct the amount 810 from the account of the customer and that amount is credited to the account of the depositor 104 by the depositor's RDFI 126. As stated above, the second subfile 132 may be processed utilizing procedures for the first subfile 130.

It will be apparent to those ordinarily skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. A method for remote deposit into an entity by a depositor, without the depositor needing a check scanner, comprising:
   operating a host system, wherein the operating is performed by the entity, and wherein the depositor connects to the host system over a telephone network;
   at a depositor location remote from the host system, receiving at least one check into a carrier apparatus;
   after the check has been received into the carrier apparatus, receiving the check-containing carrier apparatus into a fax machine at the depositor location;
   at the host system, receiving facsimile data via the telephone network and constructing digitized images of the check as a function of the facsimile data, wherein the receiving and constructing are performed by a recipient electronic device.

2. The method of claim 1 wherein the step of receiving the at least one check into the carrier apparatus comprises receiving the at least one check into a carrier apparatus that comprises a transparent film having plurality of non-overlapping pockets created therein, each of the pockets including at least one opening and being sized and shaped to receive a check therein; and front and back indicators disposed on front and back faces of the film, respectively; and unique pocket indicators disposed on the pockets.

3. The method according to claim 2, wherein the step of receiving the at least one check into the carrier comprises receiving the at least one check into a carrier in which the film size selected from the group consisting of approximately 8½×11 and approximately 8½×14.

4. The method according to claim 2, wherein the step of receiving the at least one check into the carrier apparatus comprises receiving the at least one check into a carrier apparatus that comprises a depositor indicator disposed on the film, wherein the depositor indicator is indicative of an identity of a depositor of the check.

5. The method according to claim 2, wherein the step of receiving the at least one check into the carrier apparatus comprises receiving the at least one check into a carrier apparatus in which the pocket indicators are sequential numbers.

* * * * *